United States Patent
Iwamoto

(10) Patent No.: US 9,826,120 B2
(45) Date of Patent: Nov. 21, 2017

(54) IMAGE PROCESS DEVICE THAT CONVERTS COLOR IMAGE DATA INTO MONOCHROME IMAGE DATA BASED ON A CONVERTED BRIGHTNESS COMPONENT VALUE AND IMAGE FORMING SYSTEM INCLUDING SAME

(71) Applicant: Oki Data Corporation, Tokyo (JP)

(72) Inventor: Takara Iwamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/131,112

(22) Filed: Apr. 18, 2016

(65) Prior Publication Data
US 2016/0352967 A1    Dec. 1, 2016

(30) Foreign Application Priority Data
May 28, 2015   (JP) .................................. 2015-108282

(51) Int. Cl.
*H04N 1/40*    (2006.01)
*H04N 1/60*    (2006.01)

(52) U.S. Cl.
CPC ....... *H04N 1/40012* (2013.01); *H04N 1/6005* (2013.01); *H04N 1/6027* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,013,043 B2 * | 3/2006 | Kashioka | ........... H04N 1/40012 358/518 |
| 9,129,423 B2 * | 9/2015 | Iwamoto | ............... G06T 11/001 |

FOREIGN PATENT DOCUMENTS

JP    2002-262108 A    9/2002

* cited by examiner

*Primary Examiner* — Scott A Rogers
(74) *Attorney, Agent, or Firm* — Muncy, Geissler, Olds & Lowe, P.C.

(57) ABSTRACT

An image process device includes an image acquisition part that acquires color image data as a first image data, a color space conversion part that converts the first image data to second image data of a color space, an information acquisition part that extracts a color feature quantity from the color component value for all pixels of the second image data and acquires information of the color feature quantity and the brightness component value about two adjacent pixels different in the color feature quantity among all pixels of the second image data, a derivation part that derives a brightness component value conversion parameter that differs for the color feature quantity based on the information of the acquired color feature quantity and the brightness component value, a conversion part that converts the brightness component value based on the color feature quantity of each pixel of the second image data using the brightness component value conversion parameter for the derived color feature quantity, and an image generation part that generates monochrome image data from the first image data based on the converted brightness component value.

7 Claims, 6 Drawing Sheets

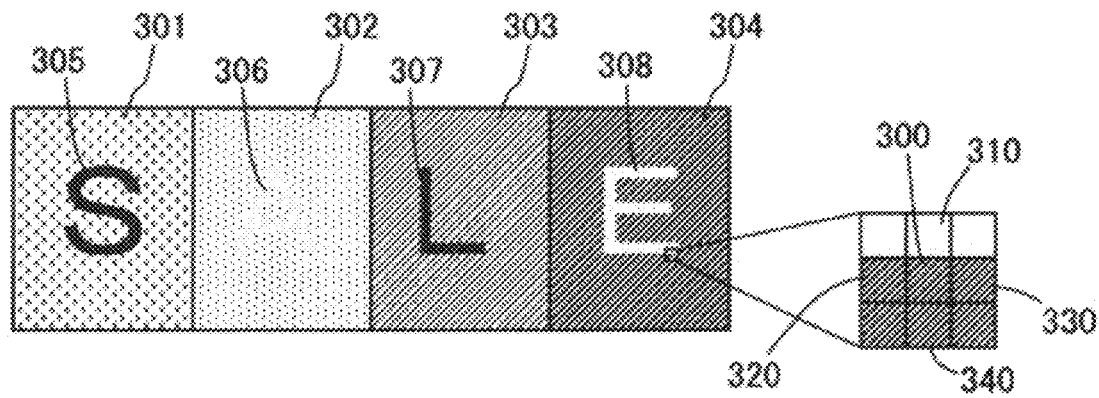
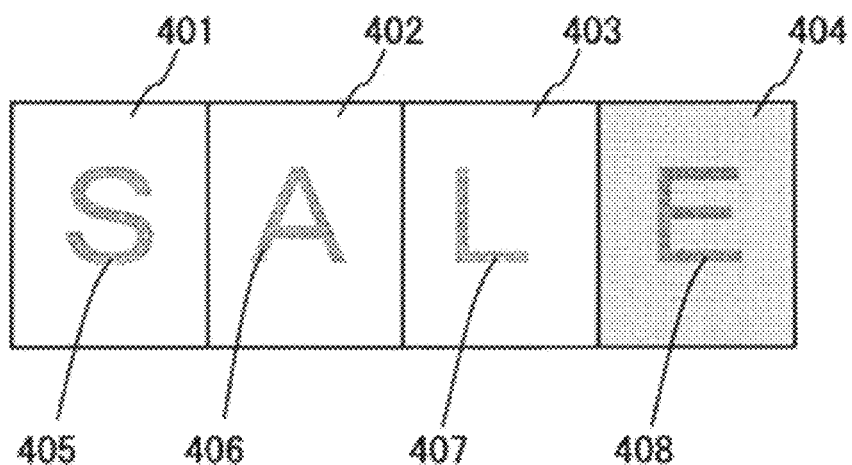

IMAGE PROCESS DEVICE THAT CONVERTS COLOR IMAGE DATA INTO MONOCHROME IMAGE DATA BASED ON A CONVERTED BRIGHTNESS COMPONENT VALUE AND IMAGE FORMING SYSTEM INCLUDING SAME

CROSS REFERENCE TO RELATED APPLICATIONS

This application claims priority under 35 USC 119 to Japanese Patent Application No. 2015-108282 filed on May 28, 2015, the entire contents which are incorporated herein by reference.

TECHNICAL FIELD

The present invention relates to an image process device and an image forming system configured to convert color image data into monochrome (single color) image data.

BACKGROUND

Generally, in an image process for converting color image data to monochrome (single color) image data, monochrome image data are generated based on brightness component information such as the luminance, the brightness, and the density of the color image data. However, in a color image, it sometimes becomes difficult to discriminate the parts that can be discriminated by the differences in the color feature quantity (hereinafter referred to as color information), such as hue and saturation, even when the difference in the brightness component (for example, brightness difference) is small by converting into a monochrome image.

Conventionally, as an image process device for solving this type of problem, there was an image process device provided with means for extracting first and second objects that are different from each other from the color image data, means for determining whether or not drawing positions of the first and second objects overlap, and brightness control means for controlling the brightness difference between the first and second objects after the monochromatic conversion so that the brightness difference becomes a predetermined value or more when the drawing positions of the first and second objects overlap (for example, see Patent Document 1).

RELATED FIELD

Japanese Patent Application Publication No. 2002-262108 (see page 6, FIG. 7)

However, in a conventional device, a brightness at a portion in which the brightness difference is less than a predetermined value is converted, but when another brightness difference at another portion is originally equal to the predetermined value or more, the brightness at the another portion is not converted. As a result, the magnitude relation of the brightness as the whole image is not maintained because the image is a mixture of the converted portions and the not-converted portions, and especially when the magnitude relation of the brightness of the same types of color information is not maintained, there was a problem that the impression of the original image was lost significantly.

SUMMARY

An image process device includes an image acquisition part that acquires color image data, which is defined as a first image data, a color space conversion part that converts the first image data to second image data of a color space in which a brightness component value and a color component value are independent, an information acquisition part that extracts a color feature quantity from the color component value for all pixels of the second image data and acquires information of the color feature quantity and the brightness component value about two adjacent pixels different in the color feature quantity among all pixels of the second image data, a derivation part that derives a brightness component value conversion parameter that differs for the color feature quantity based on the information of the acquired color feature quantity and the brightness component value, a conversion part that converts the brightness component value based on the color feature quantity of each pixel of the second image data using the brightness component value conversion parameter for the derived color feature quantity, and an image generation part that generates monochrome image data from the first image data based on the converted brightness component value.

In the invention, the "brightness component value" is defined as a value that is mainly directed to brightness among three factors of color (brightness, saturation and hue). However, it is not limited to. The brightness component value may be expressed with other color related values, such as luminance and density. For example, brightness value L* with respect to CIEL*a*b* color space, and luminance value Y with respect to YCbCr color space are available for the value. Also, any component value indicating brightness of image in a color space as well is available.

The "color component value" is defined as a value that mainly directed to saturation and hue among three factors of color. More specifically, the value is determined to be saturation and hue with respect to the color space of the second image data, not including brightness. For example, color component a*b* with respect to CIEL*a*b* color space, and color component CbCr with respect to YCbCr color space are available for the value. Also, any component value indicating any information other than brightness of image in a color space as well is available.

The "color feature quantity" is used as an indicator related to the saturation and hue expressed by the color component value. Also, the color feature quantity may be used as a general term indicating color tone/color taste that does not include brightness of image or density of print image.

According to the image process device of the present invention, it is possible to prevent a significant loss of impression of a color image in a conversion process of the color image into a monochrome image.

BRIEF DESCRIPTION OF THE DRAWINGS

FIG. 1 is a block diagram illustrating a main configuration of a hardware of an image process device according to a first embodiment of the present invention together with a scanner and a printer.

FIG. 2 is a function block diagram divided into blocks for each function content to explain a control part of the image process device.

FIG. 3 is a flowchart illustrating a flow of data processing performed by the control part.

FIG. 4 is a flowchart illustrating a flow of operations of storing the brightness color information.

FIG. 5 is a flowchart illustrating a flow of operations for deriving brightness value conversion parameters.

[FIGS. 6A and 6B] FIGS. 6A and 6B illustrate an example of a Lab color image. FIG. 6A illustrates areas different in Lab pixel value and FIG. 6B is a partially enlarged view of FIG. 6A illustrating a target pixel and peripheral pixels.

[FIG. 7] FIG. 7 illustrates one example of a monochrome image generated from a color image according to the present invention.

FIG. 8A, FIG. 8B, and FIG. 8C illustrate examples of monochrome images generated by a conventional technology that the present invention aims to solve.

DETAILED DESCRIPTION OF THE EMBODIMENT(S)

Embodiment 1

Figure 1:
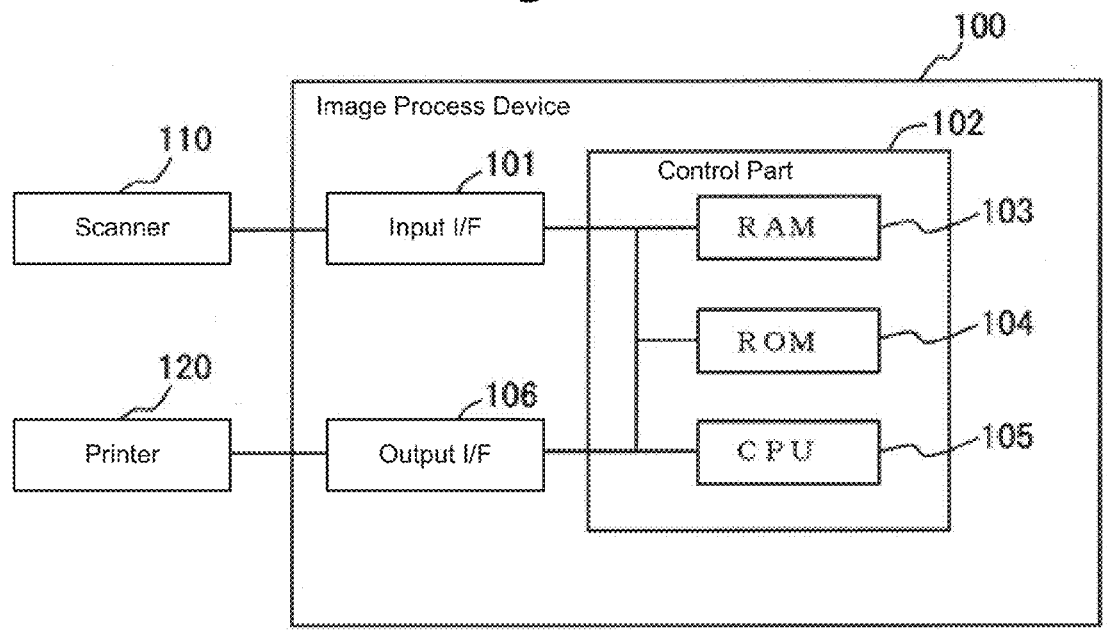
[FIG. 1]
Figure 2:
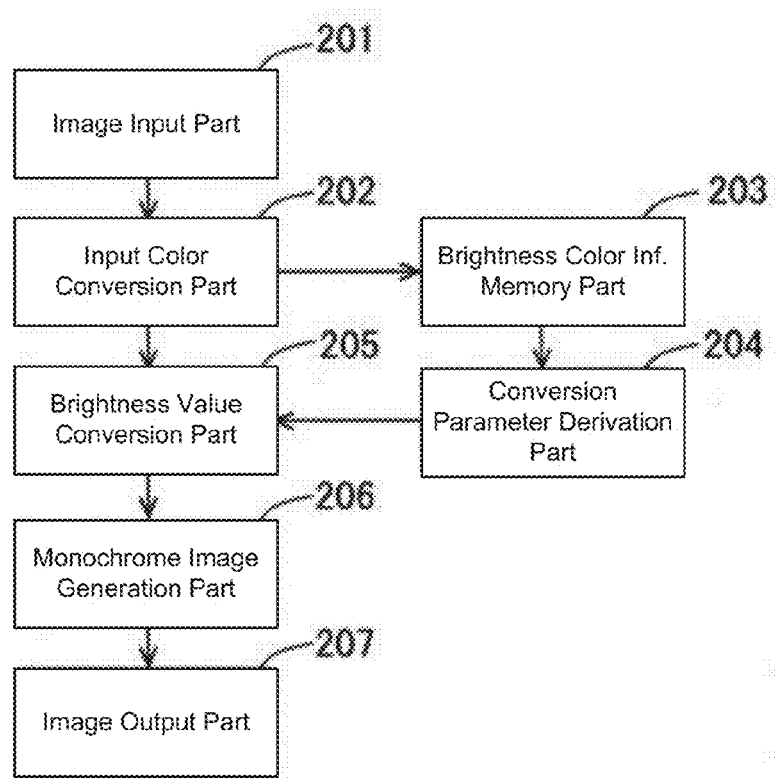
[FIG. 2]

FIG. 1 is a block diagram illustrating a main configuration of a hardware of an image process device 100 according to a first embodiment of the present invention together with a scanner 110 and a printer 120. FIG. 2 is a function block diagram divided into blocks for each function content to explain a control part 102 of the image process device 100.

In FIG. 1, the scanner 110 is equipped with a platform, a light source, a reflector, a light receiving element, a signal processing part, etc., which are not illustrated. In the scanner 110, light from the light source is irradiated onto a manuscript arranged on the platform, the irradiated light is reflected by the manuscript and the reflector provided on the back part of the scanner lid, the light receiving element receives the reflected light and reads the image signal, a signal processing such as A/D conversion and shading correction is performed by the signal processing part, RGB bitmap image data is generated, and color image data (or first image data), which is the generated bitmap image data, is transmitted to the input I/F 101 of the image process device 100.

The input I/F 101 is an interface for connecting to an external device to acquire color image data transmitted from the external device. Here, the input I/F 101 is connected to the scanner 110 to acquire color image data generated by the scanner 110 and expressed by three colors RGB bitmap image data per pixel, and transmits the color image data to the control part 102 of the image process device 100.

The control part 102 is equipped with: a RAM 103, which is a volatile memory; a ROM 104, which is a read-only memory; and a CPU 105, and performs controls such as temporary storing of color image data, and computing and execution of an image process program.

The output I/F 106 is an interface for connecting to an external device to output data processed in the image process device 100 to an external device. Here, the output I/F 106 is connected to the printer 120 and outputs the image data generated in the control part 102 which will be described later to the printer 120.

The printer 120 is an electrographic system printer which converts the received image data into binary image data of the color space (here, the color spaces by cyan (C), magenta (M), yellow (Y) and black (K)) for an output device and forms an image on a medium using toner coloring materials. Here, the printer 120 is an electrographic system color printer, but may be a monochrome printer.

Next, the control part 102 of the image process device 100 will be further explained with reference to FIG. 1 based on FIG. 2, which is a function block diagram in which each function content is divided into a block.

The communication control, the writing control, and the operation of the image processing for each blocked part are performed when, in the control part 102, the CPU 105 executes a program stored in the ROM 104 using the RAM 103 as a working memory.

The image input part 201 as an image acquisition part acquires color image data (hereinafter referred to as RGB color image data), which is RGB bitmap image data transmitted from the scanner 110 via the input I/F 101, and stores the acquired RGB color image data in the RAM 103. Here, RGB color image data transmitted from the scanner 110 via the input I/F 101 is acquired, but RGB color image data may be acquired by connecting a portable memory medium, such as, e.g., a memory medium and a USB memory stick, connected to a PC or a network.

The input color conversion part 202 converts the RGB color image data stored in the RAM 103 to CIEL*a*b (hereinafter simply referred to as "Lab"), which is a uniform color space in which the brightness value and the chromaticity value are separated. Here, a three-dimensional look-up table for calculating/deriving an output Lab value corresponding to the combination of the inputs R, G, and B is produced in advance, and the RGB value is read per pixel of the bitmap image data pixel and converted to a corresponding Lab value by referring to the three-dimensional look-up table. As to the conversion method of the color space using the three-dimensional look-up table, the method as recited in, for example, Japanese Unexamined Patent Application Publication No. H9-207389 is used.

The Lab image data as second image data converted in the input color conversion part 202 as a color space conversion part is transferred to the brightness color information memory part 203 and the brightness value conversion part 205. The brightness color information memory part 203 as an image acquisition part refers to the Lab image data converted in the input color conversion part 202, acquires the brightness value information of pixels having different color information among adjacent pixels in the Lab image data using a later explained method, and stores the acquired information in the RAM 103.

The conversion parameter derivation part 204 as a derivation part refers to the information stored in the RAM 103 in the brightness color information memory part 203, and derives the brightness value conversion parameter in which the difference in the brightness value of adjacent pixels having different color information is a predetermined value or more and a magnitude relation of the difference in the brightness value in pixels having the same color information is maintained.

The brightness value conversion part 205 as a conversion part uses the brightness value conversion parameter derived in the conversion parameter derivation part 204 to convert the brightness value L of each pixel of the Lab image data obtained in the input color conversion part 202 to the converted brightness values Lo.

The monochrome image generation part 206 as an image generation part generates single-color monochrome image data using the converted brightness value Lo converted in the brightness value conversion part 205. The image output part 207 outputs the monochrome image data generated in the monochrome image generation part 206 to the printer 120 via the output I/F 106.

Figure 3:
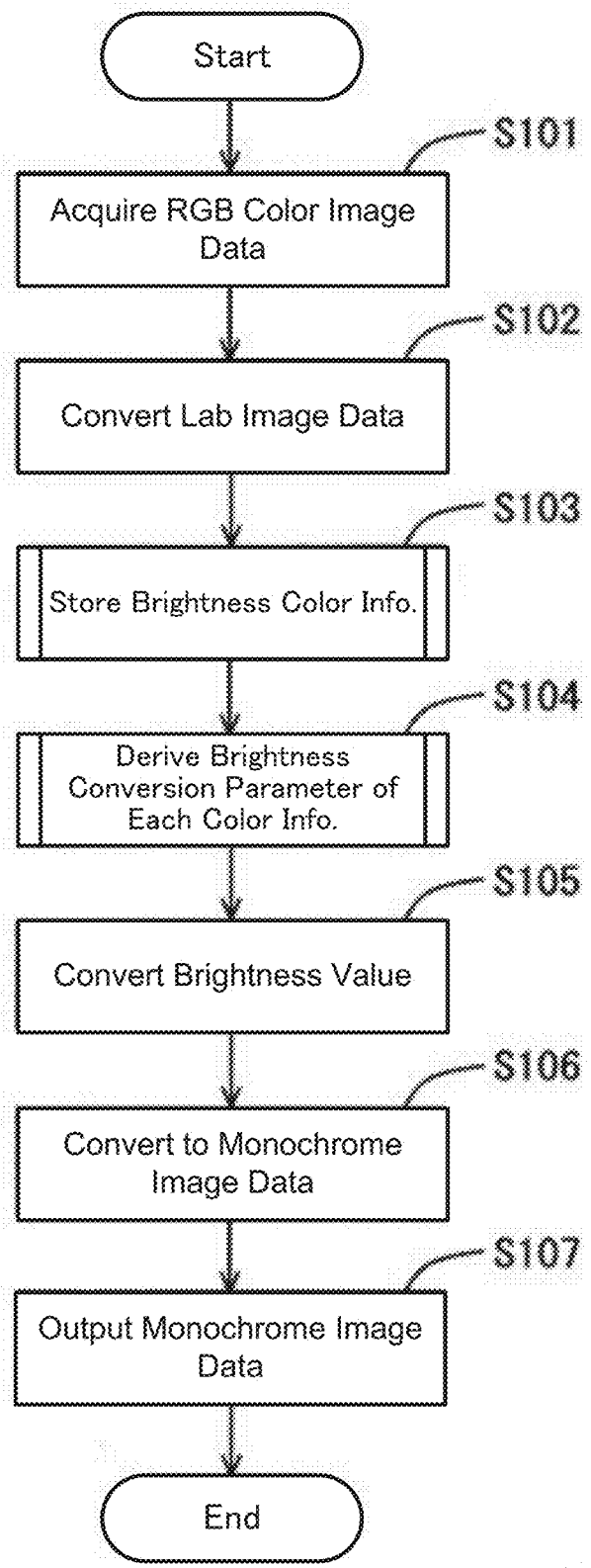
[FIG. 3]

FIG. 3 is a flowchart illustrating the flow of data processing performed by the control part 102 in the aforementioned configuration. The flow of the data processing and the processing details are further described with reference to the flowchart of FIG. 3.

First, in the image input part 201, RGB color image data is acquired from the input I/F 101 and stored in the RAM 103 (Step 101). The input color conversion part 202 converts the RGB color image data acquired in Step S101 to Lab image data by referring to the three-dimensional look-up table (Step S102).

The brightness color information memory part 203 refers to the Lab image data converted in the input color conversion part 202, and stores the brightness value information between pixels having different color information among adjacent pixels in the Lab image data (Step S103).

Figure 4:
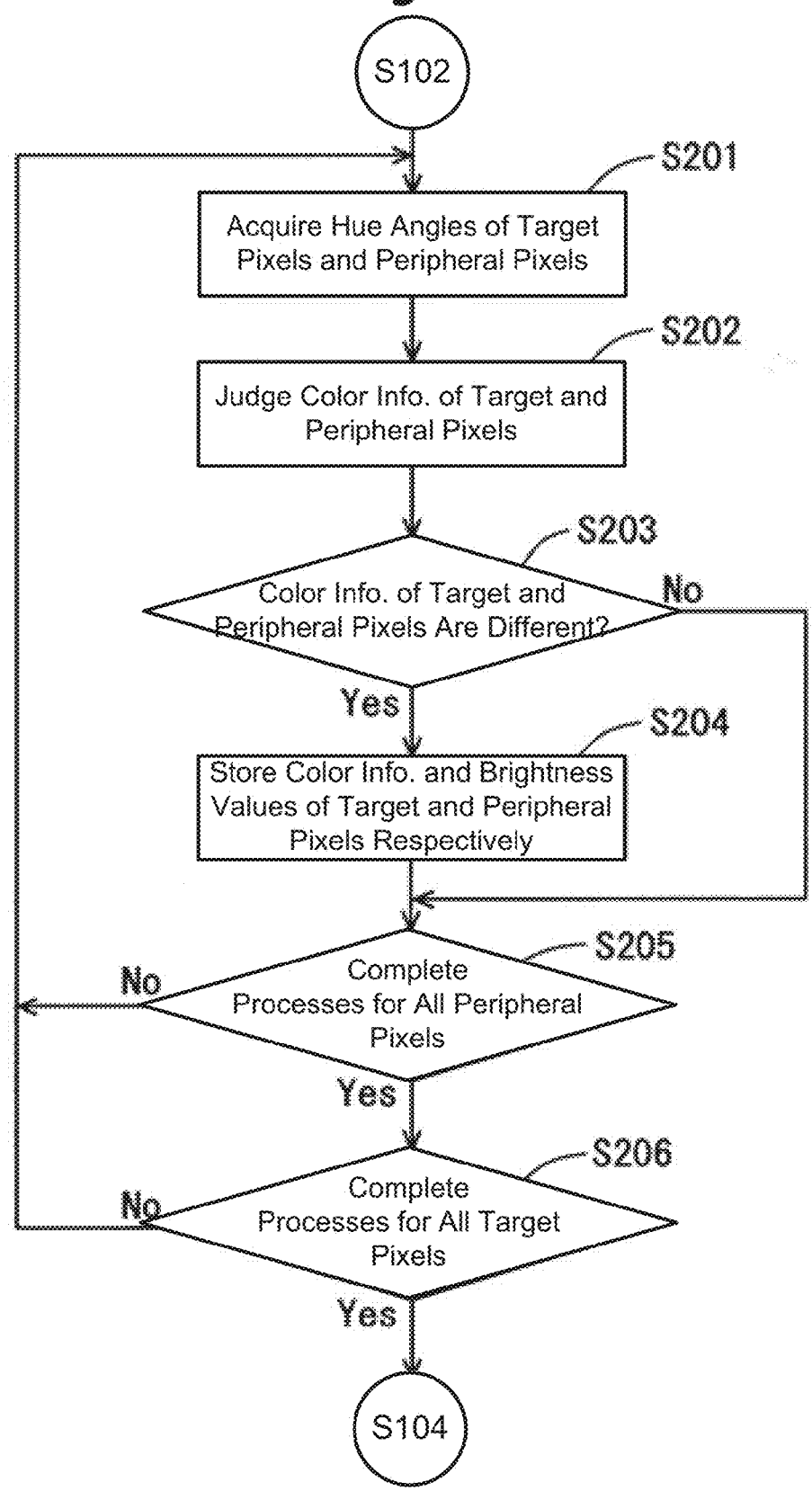
[FIG. 4]

FIG. 4 is a flowchart illustrating the operation flow of storing the brightness color information.

One pixel of Lab image data is regarded as a target pixel, and pixels adjacent to the target pixel on the left, right, top and bottom are regarded as peripheral pixels, and the color information of the target pixel and peripheral pixels is acquired. In this embodiment, a hue angle is used as color information, and hue angles H of the target pixel and the peripheral pixels are calculated using the formula (1) (Step S201).

[Eq. 1]

$$\left.\begin{aligned} H &= \mathrm{atan}(b/a) & (a > 0, b \geq 0) \\ H &= \pi/2 & (a = 0, b \geq 0) \\ H &= \pi + \mathrm{atan}(b/a) & (a < 0) \\ H &= 3\pi/2 & (a = 0, b < 0) \\ H &= 2\pi + \mathrm{atan}(b/a) & (a > 0, b < 0) \end{aligned}\right\} \quad \text{Eq. 1}$$

FIGS. 6A and 6B illustrate one example of a Lab color image. In FIG. 6A, symbols 301 to 308 are allotted to each area different in Lab pixel value, and FIG. 6B is a partially enlarged view of FIG. 6A, illustrating a target pixel 300 and its peripheral pixels 310, 320, 330, and 340. Table 1 shows examples of Lab pixel values and the calculated hue angles H for each area of the Lab color image in FIGS. 6A and 6B. Further, the hue angles H in Table 1 are the hue angles of the Lab pixel values calculated using the formula (1).

TABLE 1

| Area | L | a | b | H |
|---|---|---|---|---|
| 301 | 75 | −15 | 16 | 2.3239476 |
| 302 | 65 | −23 | 25 | 2.3145519 |
| 303 | 55 | −40 | 40 | 2.3561945 |
| 304 | 45 | −25 | 29 | 2.2822555 |
| 305, 307 | 55 | 79 | −30 | 5.9202595 |
| 306, 308 | 55 | 81 | 70 | 0.7126789 |

The areas 301 to 304 shown in FIG. 6A represent background images in Green hue having a hue angle of around 2.3 rad (around 132°) having different brightness values L, the areas 305 and 307 are character images in Magenta hue having a hue angle of around 6 rad (around 338°) having the same brightness value L as the area 303, and the area 306 and 308 are character images in Red hue having a hue angle of around 0.7 rad (around 40°) having the same brightness value L as the area 303.

FIG. 6B is a partially enlarged view of the boundary part of the character image area 308 and the background image area 304 shown in FIG. 6A, and when the pixel 300 is defined as a target pixel, the pixels 310, 320, 330, and 340 around it are defined as peripheral pixels. The target pixel 300 is a part of the background image area 304 and has a hue angle of around 2.3 rad, the peripheral pixel 310 is a part of the character image area 308 and has a hue angle of around 0.7 rad, and the peripheral pixels 320, 330, and 340 are a part of the same background image area 304 as the target pixel 300 and has a hue angle of around 2.3 rad.

Here, the peripheral pixels are defined by the four adjacent pixels on the top, bottom, right and left of the target pixel, but the peripheral pixels may be eight peripheral pixels surrounding the target pixel.

Next, it is judged that the hue angles of the target pixel and the peripheral pixels are classified into which color information group prescribed by the predetermined hue angle range (Step S202). Table 2 shows an example of the criteria for the color information herein.

TABLE 2

| Color Info. | Range of Hue Angle(s) | |
|---|---|---|
| G0 | $0 \leq H < \pi/3$ | (Red) |
| G1 | $\pi/3 \leq H < 2\pi/3$ | (Yellow) |
| G2 | $2\pi/3 \leq H < \pi$ | (Green) |
| G3 | $\pi \leq H < 4\pi/3$ | (Cyan) |
| G4 | $4\pi/3 \leq H < 5\pi/3$ | (Blue) |
| G5 | $5\pi/3 \leq H < 2\pi$ | (Magenta) |

As shown in Table 2, the groups G0 to G5 are defined by being corresponded to the 6 hues, Red, Yellow, Green, Cyan, Blue, and Magenta set for each range of hue angle H. For example, the hue information of the target pixel 300 of FIG. 6B is G2 (Green), the hue information of the peripheral pixel 310 is G0 (Red), and the hue information of the peripheral pixels 320, 330 and 340 is G2 (Green).

Next, the color information of the target pixel and the color information of the peripheral pixels are compared, and when the color information are different, (Step S203, Yes), the brightness color information for both the target pixel and the peripheral pixels are stored (Step S204) and the routine proceeds to Step S205. On the other hand, when the color information for the target pixel and the color information of the peripheral pixels are the same (Step S203, No), the routine proceeds directly to Step S205. For example, in the case of the target pixel 300 and the peripheral pixels 310, the color information are G2 and G0, respectively, which are different. And in the case of the target pixel 300 and the peripheral pixels 310, 320, and 330, the color information is the same G2.

In Step S204, each brightness color information is stored when the color information is different for the target pixel and the peripheral pixels. Table 3 is an example of the brightness color information table. For example, for the target pixel 300 and the peripheral pixel 310 of FIG. 6B, the brightness color information Info_1 shown in the first row of Table 3 is stored as the color information G2 of the target pixel 300, the color information G0 of the peripheral pixel 310, the brightness value L1=45 of the target pixel 300, and the brightness value L2=55 of the peripheral pixel 310 as the brightness color information.

TABLE 3

| Brightness Color Info. No. | Target Pixel Color Info. | Peripheral Pixel Color Info. | L1 | L2 |
|---|---|---|---|---|
| Info_1 | G2 | G0 | 45 | 55 |
| Info_2 | G2 | G5 | 55 | 65 |
| Info_3 | G2 | G0 | 65 | 65 |
| Info_4 | G2 | G5 | 75 | 65 |

TABLE 3-continued

| Brightness Color Info. No. | Target Pixel Color Info. | Peripheral Pixel Color Info. | L1 | L2 |
|---|---|---|---|---|
| Info_5 | G5 | G2 | 55 | 75 |
| Info_6 | G5 | G2 | 55 | 55 |
| Info_7 | G0 | G2 | 55 | 65 |
| Info_8 | G0 | G2 | 55 | 45 |

For one target pixel, the same processing is repeated until the information storage processing for all peripheral pixels are completed (Step S205, No), and when completed (Step S205, Yes), for the next target pixel, all information storage processing for the peripheral pixels are performed in the same manner. The same processing is repeated until the information storage processing for all pixels of the Lab color images are completed (Step S206, No), and when the processing for all pixels are completed (Step S206, Yes), the storage processing of the brightness color information is terminated.

When the processing for all pixels are completed, the brightness color information table shown in Table 3 is obtained. Info_1 to Info_8 in Table 3 are the stored brightness color information in cases where the relationships of the target pixel and the peripheral pixels in FIG. 6A are 304 and 308, 303 and 307, 302 and 306, 301 and 305, 305 and 301, 307 and 303, 306 and 302, and 308 and 304, respectively. In addition, for the boundary pixels of 301 and 302, 302 and 303, and 303 and 304, the color information are the same, that is, G2, so the brightness color information is not stored.

In the flowchart of FIG. 3, when the storage processing of the brightness color information in the aforementioned Step S103 is complete, the brightness difference of the adjacent pixels different in color information becomes the predetermined value or more in the conversion parameter derivation part 204, and a brightness value conversion parameter in which the magnitude relation of the brightness value in pixels having the same color information is derived (Step S104).

Figure 5:
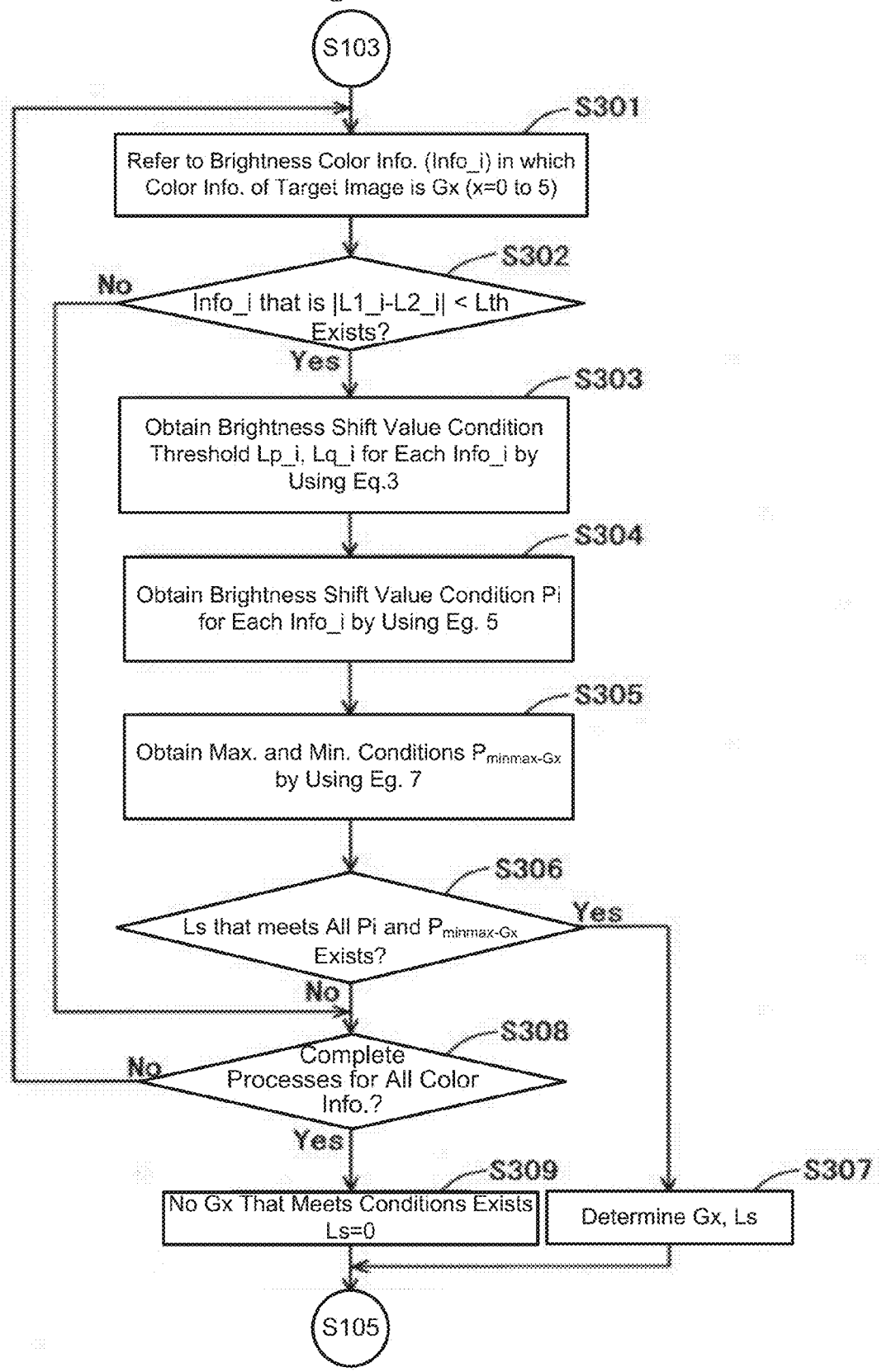
[FIG. 5]

FIG. 5 is a flowchart illustrating the operation flow for deriving the brightness value conversion parameter. In this embodiment, as shown by the brightness value conversion formula (formula (2)), the converted brightness value Lo is calculated by adding a predetermined brightness shift value Ls to the brightness value L having a specific color information Gx, and specific color information Gx and brightness shift value Ls are derived as brightness value conversion parameters.

[Eq. 2]

$$Lo = L + Ls \quad \text{(where Color Info. Is Pixel of } Gx\text{)} \\ Lo = L \quad \text{(where Color Info. Is Pixel Other Than } Gx\text{)} \quad \text{Eq. 2}$$

First, among the stored information Info_i (i=1 to 8) of the brightness color information stored in Step 5103, the stored information in which the color information of the target image is Gx (x=0 to 5) is referenced (Step S301). For example, in Table 3, in the case of G0 (x=0), the stored information of i=1 or 8 is referenced; in the case of G2 (x=2), the stored information of i=1 to 4 is referenced, and in the case of G5 (x=5), the stored information of i=5 or 6 is referenced.

Next, it is determined whether or not the stored information Info_i in which the absolute value of the brightness difference between the target pixel brightness value L1_i (i=1 to 8) and the peripheral pixel brightness value L2_i (i=1 to 8) of the referenced stored information Info_i (i=1 to 8) is less than the predetermined brightness identification threshold Lth exists (Step S302).

The brightness identification threshold Lth is a value to be determined as the brightness difference in which discernment is possible in a monochrome image, and here, it is, for example, Lth=8. When the stored information Info_i that is less than Lth exists (Step S302, Yes), the routine proceeds to Step S303, and when the stored information does not exist (Step S302, No), the routine proceeds to Step S308.

For example, when the color information of the target image is G0 (x=0), the absolute values of the brightness difference of the corresponding brightness color information Info_7 and Info_8 are both 10, and Info_i that is less than the brightness identification threshold Lth does not exist. On the other hand, when the color information of the target image is G2 (x=2) and G6 (x=6), the absolute values of the brightness difference of the corresponding brightness color information Info _2 (i=2) and Info_6 (i=6) are both |L1_i-L2_i|=0, and Info_i that is less than the brightness identification threshold Lth exists.

In Step S303, the brightness shift value condition threshold Lp_i and Lq_i are calculated using the formula (3) for each Info_i.

[Eq. 3]

$$Lp\_i = -Lth - (L1\_i - L2\_i) \\ Lq\_i = Lth - (L1\_i - L2\_i) \quad \text{Eq. 3}$$

For example, when the color information for the target image is G2 (x=2), Info_i (i=1 to 4) are corresponded, and each of the shift value condition thresholds are shown by the formula (4).

[Eq. 4]

$$Lp\_1 = 2 \\ Lq\_1 = 18 \\ Lp\_2 = -8 \\ Lq\_2 = 8 \\ Lp\_3 = -18 \\ Lq\_3 = -2 \\ Lp\_4 = -28 \\ Lq\_4 = -12 \quad \text{Eq. 4}$$

Next, the brightness shift value condition Pi for each Info_i is obtained with the formula (5) (Step S304).

$$P_i: L_s \leq L_{p\_i}$$

or $$L_s L_{q\_i} \ldots \quad \text{Eq. 5}$$

The brightness shift value condition Pi is a condition in which the brightness difference between the target pixel and the peripheral pixels of Info_i is the brightness identification threshold Lth or larger when the brightness conversion processing is performed by the formula (2). For example, in the case of G2 (x=2), the brightness shift value conditions Pi of Info_i (i=1 to 4) are as shown in the formula (6).

[Eq. 6]

$$\left.\begin{array}{l} P1: Ls \leq 2 \text{ or } Ls \geq 18 \\ P2: Ls \leq -8 \text{ or } Ls \geq 8 \\ P3: Ls \leq -18 \text{ or } Ls \geq -2 \\ P4: Ls \leq -28 \text{ or } Ls \geq -12 \end{array}\right\} \quad \text{Eq. 6}$$

Next, the maximum and minimum conditions Pminmax_Gx of the brightness shift value Ls are obtained as shown in the formula (7).

$$P_{minmax\_Gx}: -\text{Min } (L1\_i) \leq L_s \leq 100 - \text{Max } (L1\_i) \ldots \quad \text{Eq. 7}$$

The maximum and minimum conditions Pminmax_Gx are conditions for not exceeding the maximum value 100 or the minimum value 0 of the brightness value L when the brightness conversion processing is performed by the formula (2). For example, the maximum and minimum condition Pminmax_Gx of the brightness shift value Ls for Info_i (i=1 to 4) corresponding to G2 (x=2) is shown by the formula (8).

$$P_{minmax\_G2}: -45 \leq L_s \leq 25 \ldots \quad \text{Eq. 8}$$

Next, it is judged whether or not there exits Ls that meets all of the brightness shift value conditions Pi in the color information Gx and the logical product P_Gx of the maximum and minimum Pminmax_Gx of the brightness shift value Ls (Step S306). When Ls that meets the logical product P_Gx is present, (Step S306, Yes), the routine proceeds to Step S307 and when it is not present (Step S306, No), the routine proceeds to Step S308.

For example, in the case of G2 (x=2), the shift value conditions and the logical product P_G2 of the maximum and minimum conditions for the corresponding Info_i (i=1 to 4) are as shown by the formula (9), and there is a brightness shift value Ls that meets the conditions. (Here, the symbol "∧" means a logical product, and "⇔" means the same value).

[Eq. 9]

$$\left.\begin{array}{l} P\_G2 \\ \Leftrightarrow P1 \wedge P2 \wedge P3 \wedge P4 \wedge P_{minmax\_G2} \\ \Leftrightarrow -45 \leq Ls \leq -28 \text{ or } 18 \leq Ls \leq 25 \end{array}\right\} \quad \text{Eq. 9}$$

In Step S307, a specific color information Gx and a brightness shift value Ls as brightness conversion parameters are determined. The color information Gx is Gx that is currently being processed (for example, G2 (x=2)) and the brightness shift value Ls is a value (for example, Ls=18) having a minimum absolute value among Ls that meets the condition P_Gx. With this, the brightness conversion formula (formula (2)) is determined like the formula (10), for example.

[Eq. 10]

$$\left.\begin{array}{ll} Lo = L + 18 & (\text{where Color Info. Is Pixel of } G2) \\ Lo = L & (\text{where Color Info. Is Pixel Other} \\ & \text{Than } G2) \end{array}\right\} \quad \text{Eq. 10}$$

In Step S308, it is judged whether or not the processing for all color information Gx are completed. When the processing for all color information Gx are completed (Step S308, Yes), the routine proceeds to Step S309. When the processing are not completed (Step S308, No), the routine proceeds to Step S301 and the processing is continued for the next color information Gx.

In Step S309, since there is no Gx and Ls meeting the conditions, the L values are not converted (Ls=0) for any color information Gx (x=0 to 5). That is, the brightness conversion formula (formula (2)) is the formula (11).

$$L_o = L \text{ (All Pixels)} \ldots \quad \text{Eq. 11}$$

In the flowchart of FIG. 3, as described above, when the derivation processing of the brightness value conversion parameter of Step S104 is completed, using the brightness value conversion formula (formula 2) derived based on the color information Gx and brightness shift value Ls, which are the derived brightness value conversion parameters, the brightness value L of each pixel of the Lab image data is converted to the converted brightness value Lo (Step S105).

Next, in the monochrome image generation part 206, single-color monochrome image data is converted based on the converted brightness value Lo (Step S106). The monochrome image is a 256 gradation data in which, for example, the monochrome luminance value Y=0 to 255 is shown in 8-bit precision, and can be sought by the formula (12).

$$Y=[2.5 5*Lo+0.5] \ldots \quad \text{Eq. 12}$$

Here, [x] in the formula shown in Y=X format means the maximum integer not exceeding x.

FIG. 7 is an example of a monochrome image generated from a color image of FIG. 6A by the present invention, and Table 4 illustrates areas 401 to 408 of the monochrome images of FIG. 7 and examples of the corresponding pixel values. That is, the pixel values of each of the areas 401 to 408 shown in Table 4 are examples of the converted brightness value Lo in which the brightness values L of the areas 301 to 308 of the color image of FIG. 6A are converted using the formula (10) and the monochrome luminance value Y calculated using the formula (12).

TABLE 4

|  | Lo | Y |
|---|---|---|
| 401 | 93 | 237 |
| 402 | 83 | 212 |
| 403 | 73 | 186 |
| 404 | 63 | 161 |
| 405 | 55 | 140 |
| 406 | 55 | 140 |
| 407 | 55 | 140 |
| 408 | 55 | 140 |

As shown in Table 4, in each of the areas 401 to 404 in which the color information is the same in the original color image, the magnitude relation of the brightness is maintained for the converted brightness value Lo and the monochrome luminance value Y, and for the converted brightness value Lo and the monochrome luminance value Y of 401 and

405, 402 and 406, 403 and 407, and 404 and 408, in which the color information are different, identifiable differences in the brightness value are secured as shown in FIG. 7.

In the aforementioned manner, the monochrome image data generated in the monochrome image generation part 206 is output to the printer 120 via the output I/F 106 in the image output part 207 (Step S107), and images are formed on a recording medium by toner coloring materials.

Here, the effects of the present invention in comparison with the conventional methods will be explained. FIG. 7 is an example of a monochrome image generated from a color image shown in FIG. 6A by the present invention, and FIG. 8 show examples of monochrome images generated using conventional technologies to be solved by the present invention.

Figure 8A:
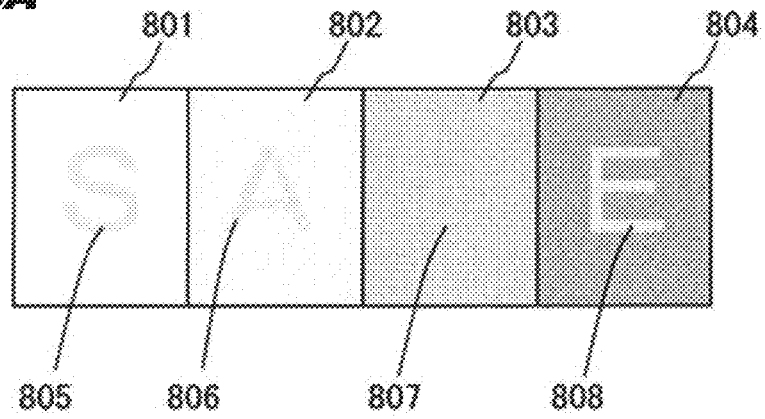
[FIG. 8A, 8B, and 8C]
Figure 8B:
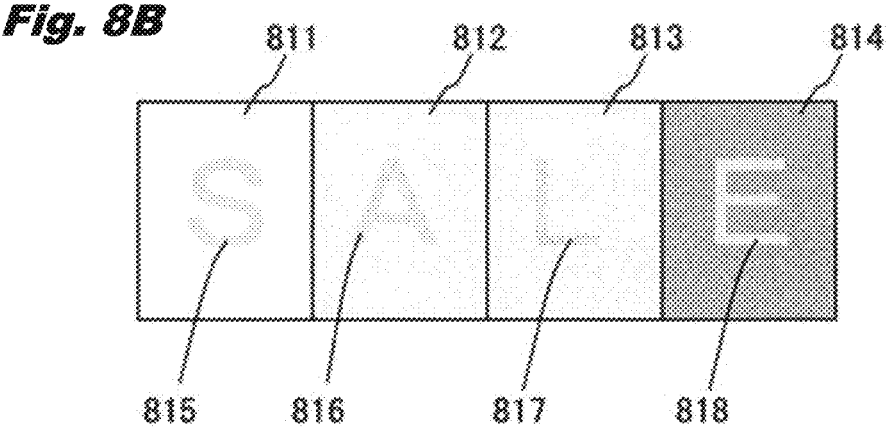
Figure 8C:
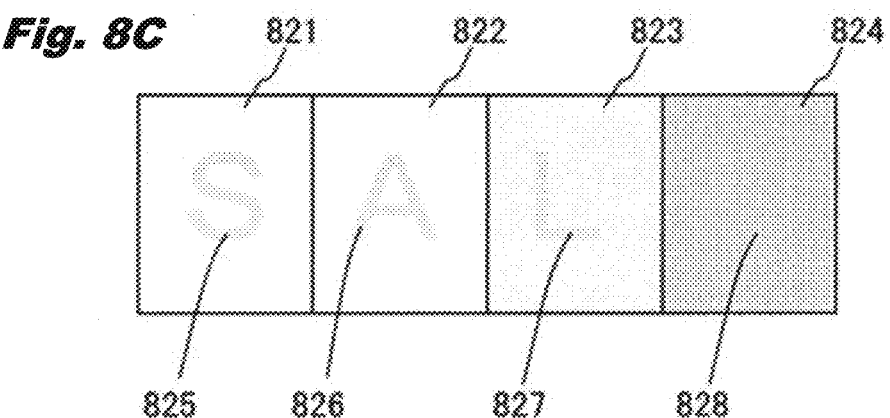

The areas 801 to 808 shown in FIG. 8A are images in which the areas 301 to 308 of the Lab color images shown in FIG. 6A are made monochrome without converting the brightness value, and as shown in Table 1, since the brightness values of the areas 303 and 307 in the color image are the same, the corresponding areas 803 and 807 in the monochrome image are undiscernible.

In FIG. 8B, 811 to 818 are images that are made monochrome by converting the brightness of one of the pixels (areas 303 and 307 that are close in brightness using the conventional technology. By increasing the brightness of 303 to make it monochrome, discernibility in the monochrome image is secured like 813 and 817. However, since the brightness conversion is performed only for the parts close in brightness, the brightness for parts that originally have differences in the brightness like 812 and 813 becomes close and the difference in the brightness as seen in the original color image may sometimes not be maintained. Especially in the original color image, when the magnitude relation of the brightness in the same color information (for example, colors with close hue) is not maintained in the monochrome image, the impression of the original image is significantly lost. To solve the problems of the aforementioned conventional technology, the pixels having the same color information is required to be converted in a unified manner.

In FIG. 8C, 821 to 828 are images that are made monochrome by converting the brightness of one of the pixels that are close in brightness (areas 303 and 307) and the brightness of similar colors (colors close in hue, areas 301 to 304) at the same time. The discernibility of the areas 823 and 827 is secured and the magnitude relation of the brightness is maintained in the areas 821 to 824. However, the brightness of the conversion result becomes close for the areas 304 and 308, in which the difference in the brightness was big in the color image. Therefore, like the areas 824 and 828, parts that are indiscernible newly occur.

The present invention was made in view of the aforementioned problems, and since the brightness conversion parameters meeting the conditions for maintaining both the discernibility of the pixels of different color information and the magnitude relation of the brightness for pixels with the same color information are derived, monochrome image in which the impression of the color image is not significantly lost like the areas 401 to 408 in FIG. 7 can be generated.

In addition, in this embodiment, a configuration example for an acquisition method of color image data in which it is received from an external scanner was described, but it is not limited to that, and a configuration to acquire from a connected PC, digital camera, and portable memory medium is also possible.

Also, in this embodiment, as an output method of monochrome image data, a configuration example in which it is output to a printer was described, but it is not limited to that. It can be a configuration such as a monitor, etc., and a configuration using other display devices such as monitors, a storage medium such as an external HDD, and it can also be configured such that an output device is internalized, and various modes can be provided.

As described above, according to the image process device of this embodiment, since a brightness color information storage part is provided, brightness information between pixels having different color information can be stored for the whole image. Further, since a conversion parameter derivation part for referencing the brightness color information is provided, the brightness difference needed between the pixels having different color information can be maintained, and the brightness value conversion parameter in which the magnitude relation of the brightness for similar color information can be derived, so in the conversion processing from a color image to a monochrome image, a significant loss of the impression of the color image can be prevented.

In this embodiment, an image process device separate from a scanner and a printer was explained, but it can also be applied to a copier, a fax machine, and a multifunction machine with an internal scanner.

What is claimed is:

1. An image process device, comprising:
    an image acquisition part that acquires color image data, which is defined as a first image data;
    a color space conversion part that converts the first image data to second image data of a color space in which a brightness component value and a color component value are independent;
    an information acquisition part that
        extracts a color feature quantity from the color component value for all pixels of the second image data and
        acquires information of the color feature quantity and the brightness component value about two adjacent pixels different in the color feature quantity among all pixels of the second image data;
    a derivation part that derives a brightness component value conversion parameter that differs for the color feature quantity based on the information of the acquired color feature quantity and the brightness component value;
    a conversion part that converts the brightness component value based on the color feature quantity of each pixel of the second image data using the brightness component value conversion parameter for the derived color feature quantity;
    an image generation part that generates monochrome image data from the first image data based on the converted brightness component value; and
    an image output part that outputs the monochrome image data generated in the image generation part to form an image on a medium based on the monochrome image data.

2. The image process device according to claim 1, wherein
    the brightness component value is a brightness value of Lab image data.

3. The image process device according to claim 1, wherein the color feature quantity is information indicating that the pixel belongs to any one of a plurality of groups in which at least one of hue and saturation is partitioned by a predetermined range.

4. The image process device according to claim 1, wherein
the information acquisition part acquires the color feature quantity and the brightness component value of each of adjacent two pixels.

5. The image process device according to claim 1, wherein
the derivation part derives a brightness value conversion parameter in which a difference between the brightness component values of adjacent pixels, which are different in the color feature quantity, is equal to or larger than a predetermined value and the color feature quantity maintains a magnitude relation of a difference of the brightness component value of each pixel.

6. An image forming system, comprising:
the image process device according to claim 1; and
an image forming part that
receives the monochrome image data generated in the image generation part and
forms an image on a medium by coloring materials.

7. The image process device according to claim 1, further comprising:
an image output part that outputs the generated monochrome image for printing.

* * * * *